US011184177B2

(12) United States Patent
Hutchison et al.

(10) Patent No.: US 11,184,177 B2
(45) Date of Patent: Nov. 23, 2021

(54) METHOD AND SYSTEM FOR SECURING IN-VEHICLE ETHERNET LINKS

(71) Applicant: SYNAPTICS INCORPORATED, San Jose, CA (US)

(72) Inventors: Guy Hutchison, San Jose, CA (US); Zubin Shah, Santa Clara, CA (US); Kamal Dalmia, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 93 days.

(21) Appl. No.: 16/533,516

(22) Filed: Aug. 6, 2019

(65) Prior Publication Data

US 2020/0092113 A1 Mar. 19, 2020

Related U.S. Application Data

(60) Provisional application No. 62/733,487, filed on Sep. 19, 2018.

(51) Int. Cl.
*H04L 9/32* (2006.01)
*H04L 9/08* (2006.01)
*H04L 29/06* (2006.01)

(52) U.S. Cl.
CPC .......... *H04L 9/3263* (2013.01); *H04L 9/0825* (2013.01); *H04L 9/0841* (2013.01); *H04L 63/0435* (2013.01); *H04L 63/062* (2013.01)

(58) Field of Classification Search
CPC ... H04L 9/3263; H04L 9/0825; H04L 9/0841; H04L 63/0435; H04L 63/062
See application file for complete search history.

(56) References Cited

U.S. PATENT DOCUMENTS

| 10,958,424 B1* | 3/2021 | Chhabra | H04L 9/0841 |
| 2008/0292105 A1* | 11/2008 | Wan | H04L 67/12 |
| | | | 380/282 |
| 2016/0035147 A1* | 2/2016 | Huang | H04L 9/3271 |
| | | | 701/31.4 |
| 2017/0006003 A1* | 1/2017 | Zakaria | H04L 9/0841 |
| 2017/0195318 A1* | 7/2017 | Liu | H04L 67/10 |

FOREIGN PATENT DOCUMENTS

| KR | 10-2014-0092130 A | 7/2014 |
| KR | 10-2018-0010608 A | 1/2018 |

OTHER PUBLICATIONS

International Search Report and Written Opinion dated Jan. 3, 2020, International Application No. PCT/US2019/051528, filed Sep. 17, 2019.

* cited by examiner

*Primary Examiner* — Hee K Song
(74) *Attorney, Agent, or Firm* — Paradice & Li LLP

(57) ABSTRACT

A method and system for securing in-vehicle ethernet links are disclosed. According to one embodiment, a method comprises receiving from an authenticator, via an insecure channel, a public key of the authenticator, a random number, and a challenge. A private key of the peer that was supplied to the peer is accessed from local storage at the peer. A state machine computes a session key for the peer, based on the random number, the public key of the authenticator, and the private key of the peer. The state machine computes a peer response to the challenge using the session key for the peer and a symmetric cipher function.

31 Claims, 6 Drawing Sheets

METHOD AND SYSTEM FOR SECURING IN-VEHICLE ETHERNET LINKS

CROSS-REFERENCE TO RELATED APPLICATIONS

This application claims priority to and the benefit of U.S. Provisional Patent Application No. 62/733,487, entitled "Method and System for Securing In-Vehicle Ethernet Links," filed on Sep. 19, 2018, the entire contents of which are incorporated herein by reference.

FIELD

This disclosure generally relates to communication systems and, in particular, to a method and system for securing in-vehicle ethernet links.

BACKGROUND

Modern vehicles and autonomous vehicles (AV) rely on a variety of hardware sensors connected to central processing units (CPUs) and/or graphics processing units (GPUs) to implement various control and/or Artificial Intelligence (AI) systems that may be used to assist a driver, or to drive the vehicle without human intervention. Such sensors are typically connected to the processors using high-speed wired communication links. In many applications, high speed data may be transferred from a source to a sink (e.g., from a sensor to a processor) substantially simultaneously with the transfer of low speed data in the opposite direction.

These communication links are vulnerable to security issues such as wire-tapping. Wire-tapping of such links can be used to remotely monitor the sensor signals and to inject malicious signals into the stream to be received by the processor. Malicious data can also be used to program the sensors incorrectly which can cause accidents when driving the vehicle. Additionally, malicious data may be displayed on a driver console display, which can cause driver error.

Currently, Mobile Industry Processor Interface (MIPI) Camera Serial Interface-2 (CSI-2) is a widely used connectivity protocol for sensor connectivity in modern vehicles and AVs. CSI-2 data is generally carried over coaxial or twisted-pair wiring using Serializer and Deserializer (SerDes) typically included in physical layer PHY devices that include a transmitter and/or a receiver. Such links can easily be tapped into by malicious agents. Other high-speed links that may be used in a vehicle include PCIe, USB, HDMI, Thunderbolt and Ethernet. Hackers can tap into these types of links as well. Examples of sensors used in modern vehicles and/or AVs include cameras, LIDAR, RADAR, GPS, etc.

Some conventional systems feature secure communication links provided by employing a symmetrical system, where devices at both ends of a data/control communication link are capable of generating encryption keys for secure communication and performing various operations related to encryption and decryption. For example, with reference to FIG. 1, in an Ethernet-based security system 100 using 802.1x and 802.1AE, that includes an authenticator 102 and a client 104, encryption is performed by an 802.1AE encryption module 106a at the authenticator 102 and by another 802.1AE encryption module 106b at the client 104. In the authenticator 102, a session key for encrypting and decrypting is provided to the 802.1AE module 106a by an 802.1x software engine 108a. The 802.1x software engine 108a runs on a processor 110a. The 802.1x software engine 108a may communicate with an external sever 112.

The processor 110a can access storage 114a that may provide a whitelist of devices that may communicate with the authenticator 102 and may also store encryption key(s) and certificate(s) generated and received by the 802.1x software engine 108a. The processor 110a also communicates with a data source/sink 116a (e.g., a video source, a sensor, a display, another processor etc.). In addition, the processor 110a communicates with and/or controls the 802.1AE module 106a and a physical layer level transceiver (PHY) 118a.

The configuration at the client 104 is generally symmetrical, in that, in the client 104, a session key for encrypting and decrypting is provided to the 802.1AE module 106b by an 802.1x software engine 108b running on a processor 110b. The processor 110b can access storage 114b that may provide a whitelist of devices that may communicate with the client and may also store encryption key(s) and certificate(s) generated and received by the 802.1x software engine 108b. Moreover, the processor 110b communicates with a data source/sink 116b (e.g., a video source, a sensor, a display, another processor etc.), and communicates with and/or controls the 802.1AE module 106b and a physical layer level transceiver (PHY) 118b.

In this configuration, both sides of the data and control link 120 are considered symmetrical from a key generation and exchange point of view. In a typical networked security system, such as the system 100, this is not an issue because the two devices at the two ends of the data/control link 120 generally contain powerful processors that can execute the software stack required to perform symmetrical key generation and to implement the exchange protocol.

In the case of modern vehicles, including smart vehicles and autonomous vehicles, and Internet of Things (IoT) applications, however, a device at one end of the link typically contains a processor but the device at the other end is often a sensor having limited processing capability and, often, no ability to run a software stack. As such, the conventional security systems are generally not suitable for use in vehicles, IoT applications, and in other similar systems.

SUMMARY

A method and system for securing in-vehicle ethernet links are disclosed. According to one embodiment, a method comprises receiving from an authenticator, via an insecure channel, a public key of the authenticator, a random number, and a challenge. A private key of the peer that was supplied to the peer is accessed from local storage at the peer. A state machine computes a session key for the peer, based on the random number, the public key of the authenticator, and the private key of the peer. The state machine computes a peer response to the challenge using the session key for the peer and a symmetric cipher function.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

DETAILED DESCRIPTION

Figure 1:
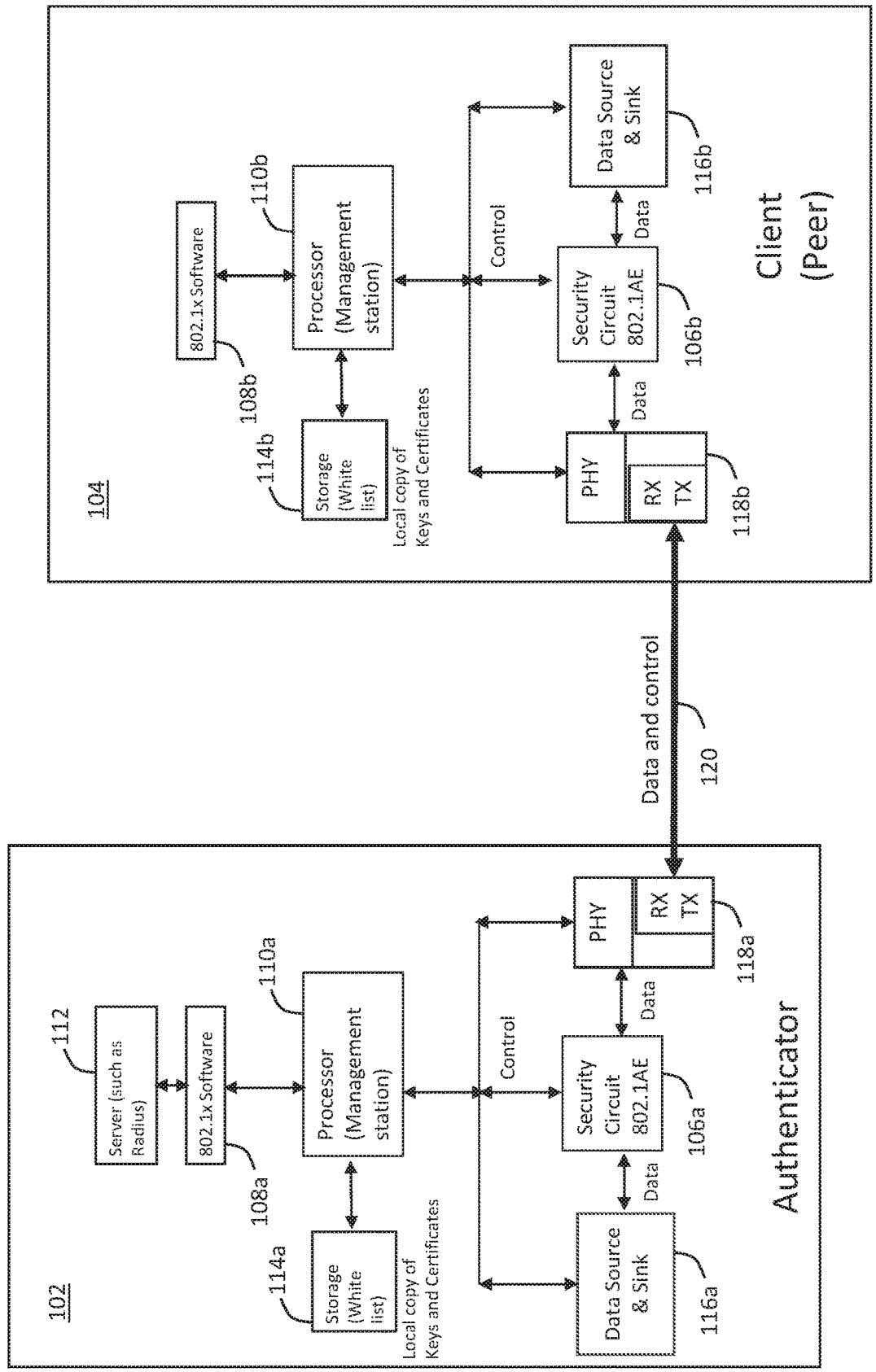
FIG. 1 schematically depicts a typical server-client authentication system.

The following disclosure provides different embodiments, or examples, for implementing different features of the subject matter. Specific examples of components and arrangements are described below to simplify the present disclosure. These are, of course, merely examples and are not intended to be limiting.

A method and system for securing in-vehicle ethernet links are disclosed. According to one embodiment, a method comprises receiving from an authenticator, via an insecure channel, a public key of the authenticator, a random number, and a challenge. A private key of the peer that was supplied to the peer is accessed from local storage at the peer. A state machine computes a session key for the peer, based on the random number, the public key of the authenticator, and the private key of the peer. The state machine computes a peer response to the challenge using the session key for the peer and a symmetric cipher function.

In various embodiments, a short asymmetric challenge ("SAC") is provided that can support authentication and key derivation. Embodiments of the SAC technique can be integrated with EAP and, as an EAP technique, SAC is highly scalable and generally needs no user intervention. Moreover, the SAC technique imposes relatively lightweight computing on an endpoint—making it highly favorable for sensors, IoT endpoints, and other devices that have limited processing capabilities. The EAP-based SAC technique can reuse existing enterprise and global infrastructure used in EAP-based authentication and, thus, can be readily deployed. With a public-private key pair provisioned during manufacturing and/or maintenance, secure keys for encrypting communication can be generated on an insecure channel. Endpoints can nevertheless be securely authenticated using embodiments of the SAC technique.

Terminology

The following list provides the general meaning of certain terms used in this disclosure.

EAP (Extensible Authentication Protocol)—An authentication framework which supports multiple authentication methods defined in RFC 3748.

SAC (Short Asymmetric Challenge)—An authentication method described herein for a challenge-response authentication between two mutually independent entities each having an elliptical curve public-private key pair. As an asymmetric challenge-response mechanism, it can ensure that both parties establish a shared secret over an insecure channel, where the shared secret can be used further to derive symmetric keys for encrypted communication over an insecure channel. EAP-SAC can be used as an EAP method to authenticate entities and encrypt communication.

EAP authenticator—The end of the link initiating EAP authentication. The term authenticator is derived and has the same meaning as described by IEEE-802.1X and RFC 3748. In this document unless otherwise specified authenticator or an EAP authenticator refers to the same entity.

EAP peer—The end of the link that responds to the authenticator and is being authenticated. This term is interchangeable with the term supplicant widely used by IEEE-802.1X. In this document unless otherwise specified peer or an EAP peer refers to the same entity.

EAP server—A backend authentication server that provides authentication assistance to the authenticator. An EAP server can act as an independent entity or integrated with the EAP authenticator, but serves the same functionality of storing, verifying, and authenticating an EAP peer.

ECDH—Elliptical Curve Diffie-Hellman is an anonymous key agreement protocol that allows two parties, each having an elliptical-curve public-private key to establish a shared secret over an insecure communication channel.

IoT—Internet of Things is the network of computing devices present anywhere and everywhere. It is defined typically as a network of endpoints capable of communicating over wired or wireless networks. Endpoints are physical devices, vehicles, home appliances, home security and automation appliances, actuators, sensors, imaging devices, etc. Typically these endpoints relay physical information to digital or computer based systems.

IEEE 802—IEEE 802 is a family of IEEE standards dealing with local area networks (LAN) and metropolitan area networks (MAN).

IEEE 802.1—IEEE 802.1 is an IEEE working group responsible for 802 LAN/MAN architecture, internetworking of LANs, MANs and WANs, 802 link security, network management and protocol layers above MAC and LLC.

IEEE 802.11—IEEE 802.11 is a set of media access control (MAC) and physical layer (PHY) specifications for implementing wireless local area networks (WLAN).

IEEE 802.1X—IEEE 802.1X is an IEEE standard for port based network access control. It is part of the IEEE 802.1 group of network protocols. The latest revision of this specification is defined by IEEE 802.1X-2010.

PPP—Point-to-Point Protocol is a data link communication protocol used to establish a direct connection between two nodes.

Extensible Authentication Protocol (EAP) is an authentication framework generally used to authenticate endpoints on wireless, wired, and point-to-point networks. EAP as a framework relies on EAP methods to negotiate credentials for authentication and key derivation. EAP supports multiple authentication methods and a number of suitable authentication methods are provided. EAP typically runs directly over data link layer and, hence, can support several encapsulation schemes to encapsulate EAP messages. Two widely popular methods of implementing EAP include IEEE 802 and Point-to-Point Protocol (PPP). For wired (LAN) and wireless (WLAN) networks, IEEE 802.1X is a commonly used standard for port based network access control. IEEE 802.1X provides authentication mechanism to endpoints joining a wired or wireless network, and defines the encapsulation of EAP over IEEE 802 frames.

EAP generally provides a messaging framework to authenticate endpoints. It provides flexibility in selecting the authentication mechanism to be negotiated, and there are several EAP methods defined by IETF RFCs, several vendor extensible methods, and experimental methods. EAP methods generally implement a wide variety of security ranging from passwords, challenge-handshake authentication protocols, lightweight extensible authentication protocol using user credentials, X.509 certificate based TLS, MD5 based challenge, pre-shared credentials or keys, IKEv2, etc.

Over a period of time, the EAP methods have evolved from simple and insecure mechanisms to secure but computationally intensive mechanisms requiring pre-configured certificates and enterprise class scalable infrastructure. These methods support authentication techniques based on passwords, one-time passwords, pre-shared keys, high entropy shared keys, symmetric keys, public key certificates, and many other mechanisms to serve specific purposes. In general, EAP is a messaging framework and is agnostic to the encapsulation used to carry these messages. Typically EAP is encapsulated into 802.1X frames, 802.11, PEAP, RADIUS, or any other wired protocol capable of carrying these messages. EAP and its applications have evolved around endpoints that are typically personal computers, workstations, servers, mobile devices, and similar computing devices. These endpoints typically have significant computing capability and pre-provisioning support to run existing EAP methods.

With the advent of IoT (Internet of Things), computing devices that need to be authenticated with the highest security are ubiquitous, and are employed in from modern vehicles including autonomous vehicles, mobile devices, home automation systems, industrial automation systems, etc. The requirements for authenticating endpoints in such systems is drastically different in terms of the scale of devices, limitations on their computing capabilities, and time required for authentication. In general, due to the limited computing capabilities of various endpoint devices such as sensors, IoT devices, etc., various EAP methods including EAP-MD5, EAP-SIM, EAP-TLS, EAP-PSK, etc. are also generally not suitable for use in vehicles (including autonomous vehicles), IoT applications, and in other similar systems.

Figure 2:
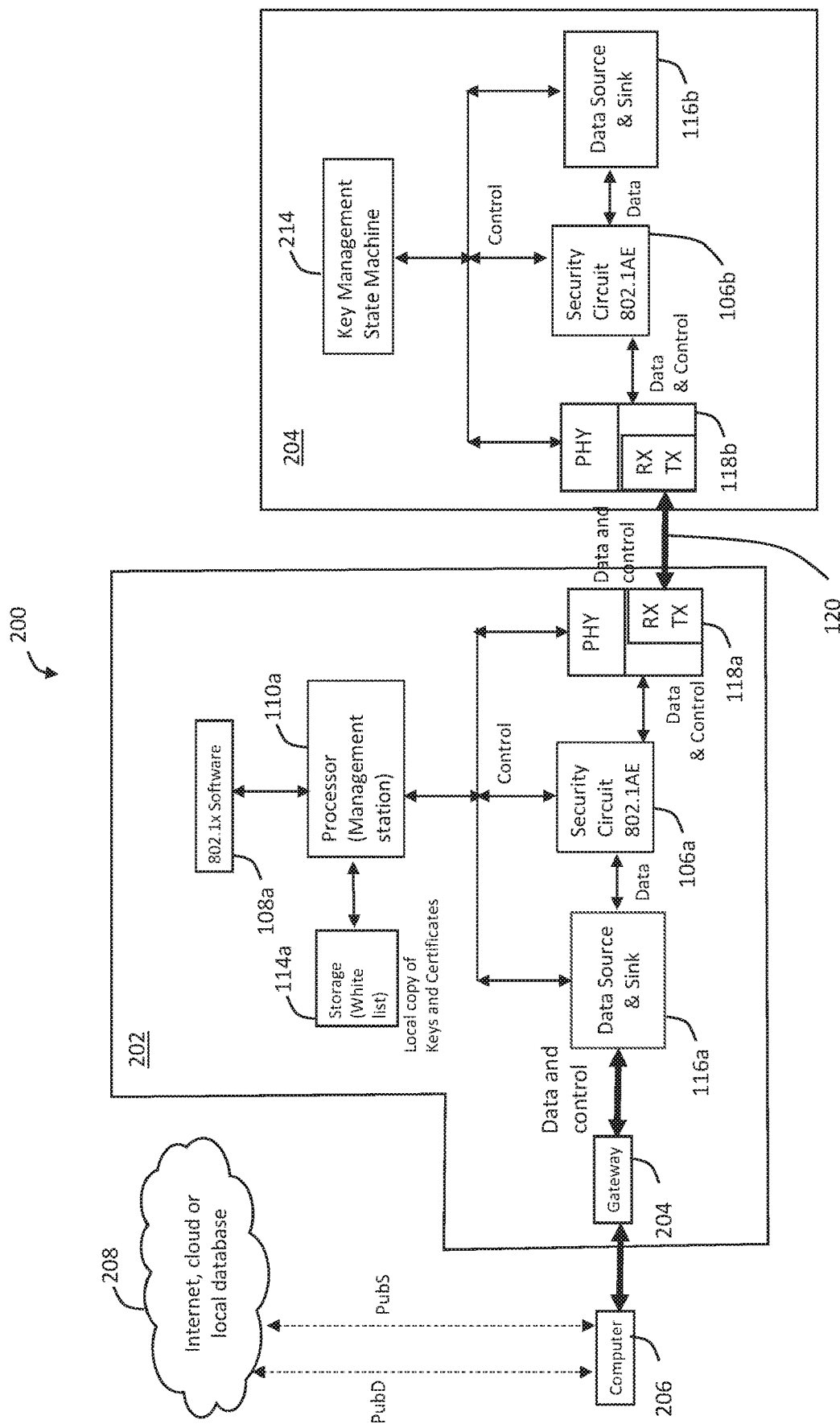
FIG. 2 schematically depicts an authentication system for performing client initiation, featuring a client having limited processing capacity, according to one embodiment.

With reference to FIG. 2, an exemplary system 200 implementing a security mechanism for Ethernet using asymmetrical key generation, according to one embodiment, includes an endpoint 202 (e.g., a host unit (HU)). The endpoint 202 includes a gateway 204 that, via a computer 206, can communicate with a database 208 that can be a local database or a network/cloud based database. The database 208 can be a public database or a private database, and may be implemented as a blockchain. The endpoint 202 can store and/or access public keys for the endpoint 202 and/or an endpoint 212 (e.g., a sensor unit (SU)) that is also included in the system 200.

The endpoint 212 includes 802.1AE module 106*b* for encrypting and decrypting messages using an encryption key, a data source/sink 116*b* (e.g., a video source, a sensor, a display, another processor etc.), and a physical layer level transceiver (PHY) 118*b*. The endpoint 212 does not include an 802.1x software engine running on a processor. Instead, the endpoint 212 includes a state machine 214 for key management (as discussed below). The state machine 212 may have limited computing capacity. The two endpoints 202, 212 can communicate via the link 120 and can exchange data and/or control information.

System 200 can be used for the initial programming and/or subsequent checking/testing of the endpoints 202, 212 that can communicate with each other via an Ethernet link (e.g., the link 120). Such endpoints may be provided in a vehicle or may be part of an IoT system. The computer 206 is provided at an external facility, e.g., a vehicle manufacturing or repair facility. At the time of initial programming (e.g., at the time of manufacture or maintenance), the computer 206 may assign to the endpoint 212 (e.g., the sensor unit (SU)) a unique identifier such as universally unique identifier (UUID). The computer 206 may also generate a public key/private key pair: PubS, PrvS for the endpoint 212. In some cases, the endpoint 212 may generate and provide the key pair. The UUID and private key (PrvS) are stored on the endpoint 212 in non-volatile storage (not shown). The UUID and public key (PubS) are uploaded to the database 208, so that this information can be accessed by the gateway 204 at a later time.

Figure 3:
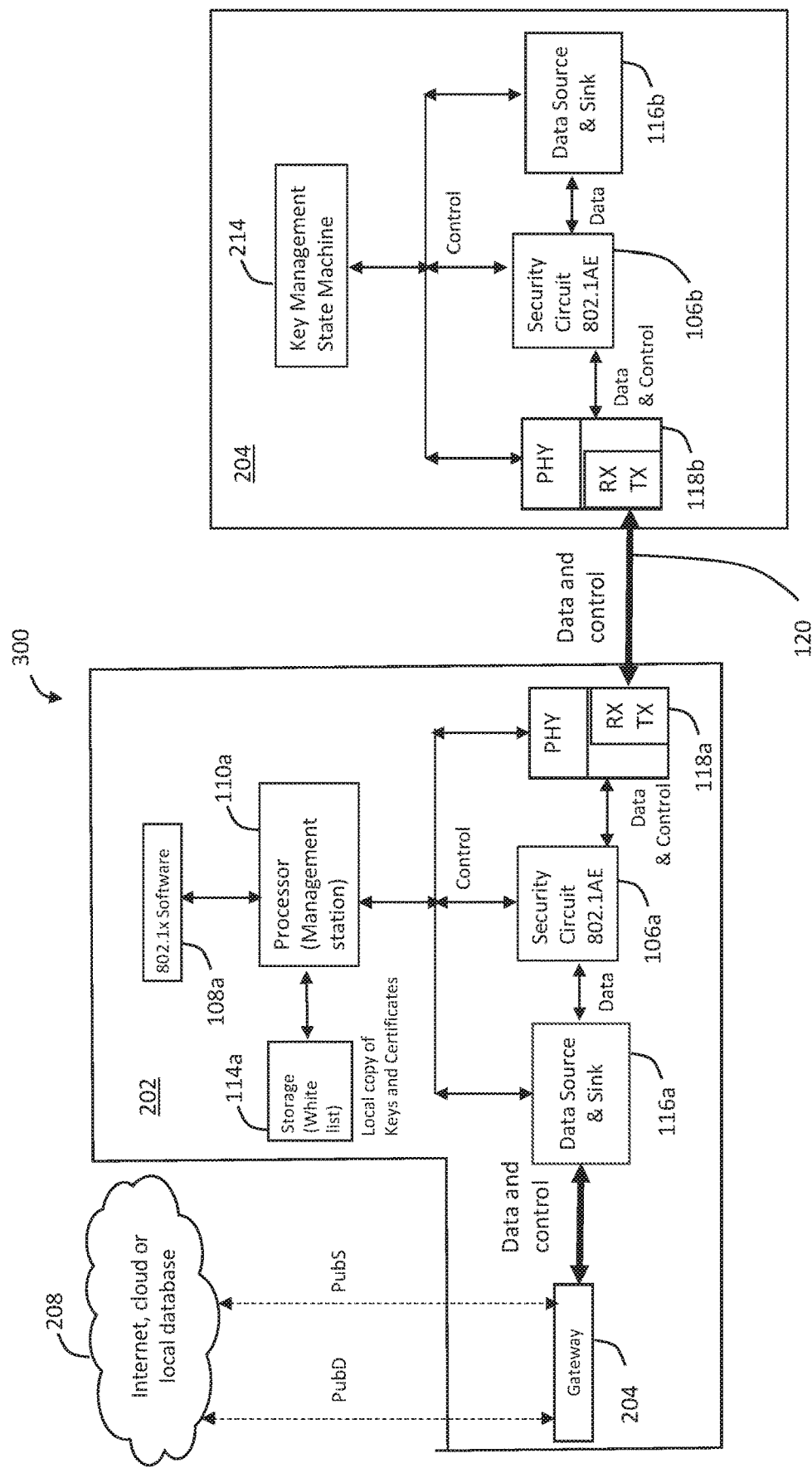
FIG. 3 schematically depicts an authentication system for performing client authentication, featuring a client having limited processing capacity, according to one embodiment.

With reference to FIG. 3, another exemplary system 300 implementing a security mechanism for Ethernet using asymmetrical key generation, according to another embodiment. In system 300, the gateway 204 is configured to communicate directly with the database 208, without needing the computer 206. As such, the endpoint 202 can authenticate the endpoint 212 generally at any time and in any place, e.g., when the two endpoints 202, 212 are included in a vehicle and the vehicle is moving. Authentication of the endpoint 212 (e.g., the SU) may be initiated only by the endpoint 212, only by the endpoint 202 (e.g., a host processor (HP)), or by either endpoint.

In the discussion below, references are made to a host unit (HU) and to a sensor unit (SU) for the sake of convenience only. In general, any endpoint (e.g., endpoint 202 in FIGS. 2 and 3, such as a processor, a server, a data source, a data sink, and/or a sensor, an IoT device, etc.) may perform the operations described with reference to the host unit (HU) and any other endpoint (e.g., endpoint 212 in FIGS. 2 and 3, such as a camera, a display, an IoT device, a GPS, and/or a data source, a data sink, etc.) may perform the operations described with reference to the sensor unit. Also, in the discussion below, examples of EAP-based signals/frames are provided for the sake of convenience only. SAC-based messaging described herein is not limited only to EAP and can be used with other Ethernet or even wireless communication/authentication protocols.

Figure 4:
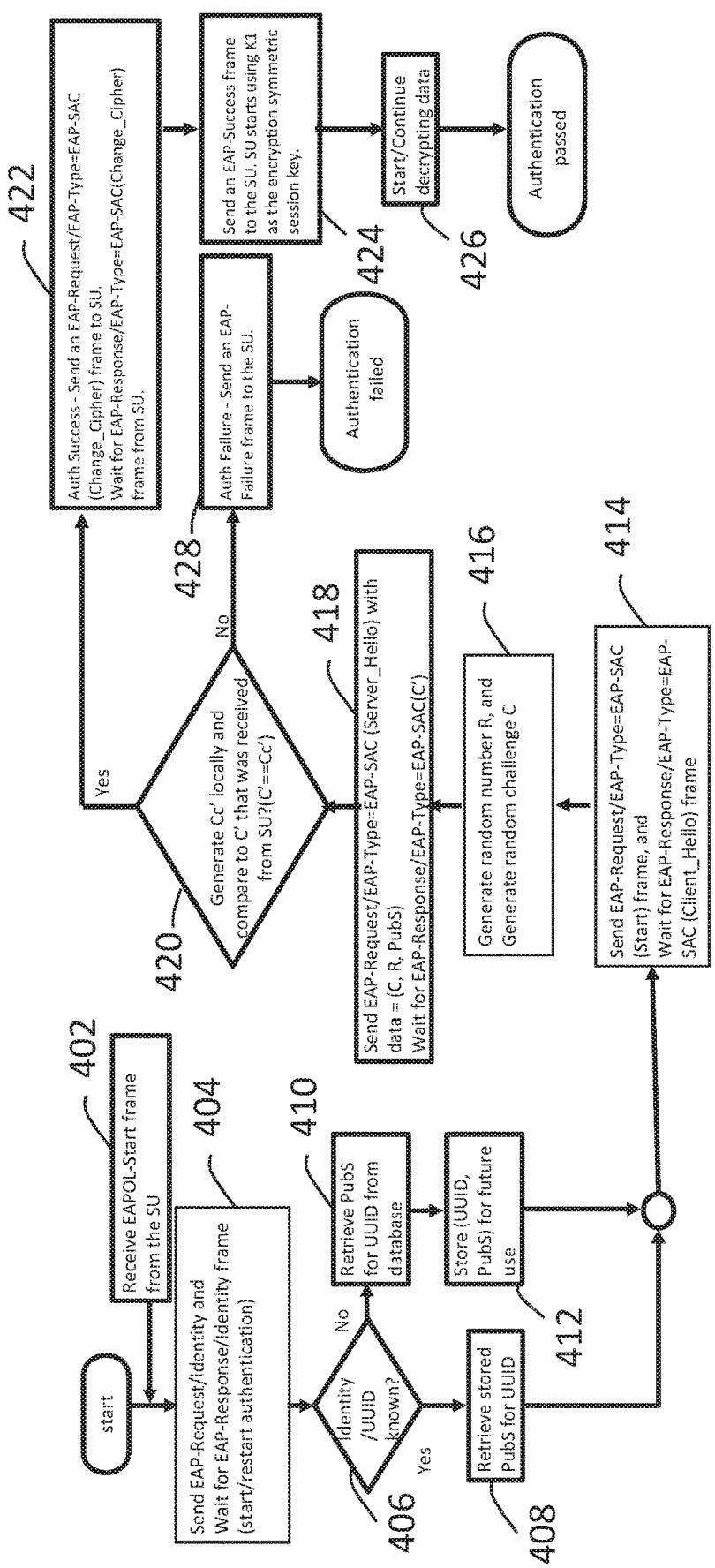
FIG. 4 is a flow chart illustrating a process by which an authenticator can authenticate a client, according to one embodiment.

With reference to FIG. 4, in an exemplary host initialization process 400 according to one embodiment, on power up or restarting the device initialization process, a sensor unit begins transmitting a start authentication message (e.g., an 801.1X EAP over LAN (EAPOL)-Start frame) on the Ethernet link (step 402). The sensor-unit continues to send the start authentication message (e.g., EAPOL-Start frame) until it receives an identification request message (e.g., EAP-Request) from a host processor. The host processor upon receiving the start authentication message (e.g., the EAPOL-Start frame) from the SU, sends an identification request message (e.g., a EAP-Request/Identity frame) to the SU (step 404).

Upon receiving the identification request message (e.g., the EAP-Request/Identity frame), the SU responds with an identifier message (e.g., EAP-Response/Identity frame) containing the SU's identifier (e.g., UUID) which is read from its non-volatile memory. (step not shown). This identifies the unique identity of the SU to the HP. If the UUID is known to the HP (step 406), the HP retrieves the public key (PubS)

for the sensor unit from the local storage (step 408). Otherwise, the HP retrieves the public key (PubS) for the sensor unit from an Internet based public or private database or blockchain (e.g., the database 208 in FIGS. 2 and 3) (step 410 in FIG. 4). The HP may store the retrieved public key (PubS) in the local storage (step 412).

The HP verifies the identity of the SU, and sends a short asymmetric challenge, SAC-request start, (e.g., EAP-Request/EAP-Type=EAP-SAC (Start) frame) (step 414). The start message/frame indicates that the SU should participate in a short asymmetric challenge-request protocol. Upon receiving this message, the SU responds with a SAC client ready message (e.g., EAP-Response/EAP-Type=EAP-SAC (Client_Hello) frame) indicating that the SU will participate in a short asymmetric challenge. (step not shown).

The security circuitry on the HP side (e.g., the encryption/decryption module 106a in FIGS. 2 and 3) uses a random number generator to generate a random number (R) and private key pair (PubH, PrvH) (step 416). The challenge generator (not shown) on the HP side uses a random number generator to generate a random challenge (C) (step 416). The combination of (R, PubH, C) is sent to the SU via an authenticator SAC challenge message (e.g., EAP-Request/EAP-Type=EAP-SAC (server_hello) step (418). The SU receives the authenticator SAC challenge message (e.g., the EAP-Request frame), and the security circuitry of the SU (e.g., the encryption/decryption module 106b in FIGS. 2 and 3) generates a response (C') using a key agreement protocol, e.g., an ECDH algorithm, and a symmetric cipher algorithm (e.g., AES), as follows:

E (R, PubH, PrvS)→K1, where E is a function representing the key agreement protocol (e.g., the ECDH algorithm), and K1 is an encryption/decryption key (also called a session key) output by the function.

AES (C, K1)→C', where AES can be any symmetric cipher algorithm, and C' is an encrypted version of the challenge C, where the encryption is performed using the key K1. This computed response (C') is sent to the HP via an SAC client response message (e.g., EAP-Response/EAP-Type=EAP-SAC (C')) (step not shown).

Upon receiving the client response message, the security circuitry of the HP confirms the value of the response by comparing the value C' (received from the SU) with a value Cc' computed by the security circuitry of the HP (step 420) as follows:

E (R, PubS, PrvH)→K1', where E is the same function used by the SU, representing the key agreement protocol (e.g., the ECDH algorithm), and K1' is an encryption/decryption key (also called a session key) output by the function when executed by the HP.

AES (C, K1')→Cc', where AES is the same symmetric cipher algorithm used by the SU, and C' is an encrypted version of the challenge C where the encryption is performed using the key K1'.

On the HP side, the security circuit compares C' with Cc' (step 420), and enables the session key K1' to be used for encryption of data traffic if: C' is equal to Cc', which implies that the keys K1 and K1' are also identical, though they were generated independently. In this case, the HP determines that the SU is authentic.

If the authentication succeeds, the HP sends an SAC-end message (e.g., EAP-Request/EAP-Type=EAP-SAC (change_cipher, challenge_finished) frame) to the SU, indicating thereto that it is authenticated (step 422). The SU responds with the SAC-begin message (e.g., EAP-Response/EAP-Type=EAP-SAC (change_ciper) notification) indicating that the SU is ready to use the updated session key K1 in further communication with the HP (step not shown).

The HP sends an authentication success message (e.g., EAP-Success frame) to the SU (step 424), and uses the key K1' key computed in step 420 for encrypting the data/control information to be transmitted to the SU (step 426). Upon receiving the authentication success message (e.g., EAP-Success frame) the SU uses the key K1 as the generated session key, which the SU had computed earlier, for encrypting the data/control information to be transmitted to the HP (step not shown). If the authentication fails, i.e., when C' is not equal to Cc', the HP sends an failure message (e.g., EAP-Failure message) to the SU (step 428).

The above-described scheme allows the same session keys (K1 and K1') to be generated independently on the HP and SU. The sensor side circuitry encrypts each frame to be transmitted to the HP with session key K1. The HP side circuitry decrypts frames with session key K1', where the keys K1 and K1' are the same when the authentication succeeds. Encrypting all or selected frames of data/control traffic can prevent or minimize snooping and altering of traffic between the sensor unit and host processor. Authenticating the sensor unit can also prevent man-in-the-middle attacks. The present EAP-SAC authentication technique can eliminate the need for a complex authentication protocol and, accordingly, various embodiments described herein do not need a microprocessor or an operating system on the sensor unit to perform key management functions, and thus the system cost and/or complexity can be reduced.

In various embodiments, the SAC (Short Asymmetric Challenge) based security mechanism allows for lightweight devices (sensors, IoT devices, etc.) to implement a relatively lightweight authentication protocol while providing security comparable to that provided by complex certificate-based systems. This is achieved, at least in part, using asymmetric key exchange protocols for authentication as well as for communication over an insecure channel such as Ethernet, I2C, etc. In various embodiments, the host processor can participate in authenticating multiple sensor units simultaneously.

According to one embodiment, the public database (e.g., the database 208 in FIG. 3) is accessed only when a new SU identifier (e.g., UUID) is received by the HP. A system 300 (FIG. 3) implementing the authentication process 400 (FIG. 4) does not require continuous network connectivity and, as such, the system 300 can be operated in a moving vehicle (or vehicle with limited network connectivity). Furthermore, a change in the SU identifier would cause the HP to obtain a new public key for the SU and can thus be a trackable security event.

User Intervention

Endpoint devices that can be included in the present SAC-based system can range from a sensor, a camera device, an actuator, or a relatively complex computing device running an operating system. For any of these devices, no user intervention is generally needed to initiate the authentication process. The device only needs to be powered on and is required to implement a simple state machine. For the end user, it is a simple plug and play event, but in the background the device's security mechanism (e.g., the EAP mechanism) gets authenticated automatically and keys are generated automatically, as well, for secure communication over an insecure channel.

Computing Capability

Devices implementing an embodiment of the SAC mechanism run a lightweight authentication protocol (e.g., EAP) that may be embedded in a small processor or may be provided as an integrated circuit. The authentication protocol (e.g., EAP) can retrieve cryptographic keys, execute lightweight cipher algorithms, generate random numbers, and respond to authentication protocol messages (e.g., EAP messages) over an insecure communication channel.

Storage

Devices implementing an embodiment of the SAC mechanism require minimal storage (less than 1 kB for many cases) to store a unique identifier (e.g., a serial number, a UUID, a product code, etc.) and a set of cryptographic keys.

Computing Challenge and Response

SAC as an authentication mechanism uses a key agreement protocol (e.g., ECDH) and a symmetric key cipher to challenge a peer to be authenticated (also called a client) and verify its response, using an authentication protocol (e.g., EAP) over an insecure channel. Every entity (an authenticator and a peer to be authenticated) participating in the SAC process has access to its own, unique public-private key pairs. These public-private key pairs can be one-time programmable, e.g., during the manufacturing process. In addition, the authenticator has access to a database of public keys of the peers to be authenticated where, based on the unique identity of the peer to be authenticated, its public key can be retrieved.

Symmetric Cipher

SYM_CIPHER refers to a symmetric cipher that is on an endpoint and provides sufficient security not to compromise session keys K1. Any strong symmetric cipher such as AES, DES simple hash of various known parameters, etc., can be used in different embodiments.

Challenge

An authenticator can challenge a peer to be authenticated with any random number. There is no requirement for the challenge (C) to have been derived from a previously known pattern, though a challenge derived in this manner can be used. For the security of the system both the number for the challenge C and the ECDH seed R is not re-used, and is unpredictable to an attacker.

Response calculated by a peer to be authenticated

A peer to be authenticated has access to its own public-private key pairs (PrivH and PubH). In addition when it receives an authenticator SAC challenge message (e.g., the EAP-Request/Challenge message), the peer to be authenticated receives the following data from the authenticator:

PubH—The authenticator's public key

R—Random number to be used by the key agreement protocol (e.g., the ECDH cipher algorithm)

C—challenge to be used in computing the response

These received parameters are used to compute symmetric session key K1, such as, e.g.:

K1=ECDH (PubH, PrivS, R)

The symmetric session key K1 is then used to encrypt the challenge C using any SYM_CIPHER which forms the response to the challenge.

C'=SYM_CIPHER (K1, C)

Response Calculated by an Authenticator

An authenticator obtains the identity of the peer to be authenticated by sending thereto an identification request message (e.g., an EAP-Request/Identity message). This allows the authenticator to query a database of public keys to fetch a public key (PubS) associated with the unique identity of the peer to be authenticated. The authenticator has access to its own public-private keys PubH and PrivH. This allows the authenticator to compute the same symmetric session key Kc1 using PubS, PrivH and R sent to the peer to be authenticated. For example, using ECDH as a key agreement protocol, Kc1 is computed as:

Kc1=ECDH (PubS, PrivH, R)

The authenticator then computes its own response (Cc') to the challenge (C), and compares the response (Cc') with the response (C') received from the peer to be authenticated. The authenticator's response (Cc') is computed as:

Cc'=SYM_CIPHER (C, Kc1)

The comparison succeeds when Cc' is equal to C' if and only if the key Kc1 is the same as the key K1. As such, this SAC-based mechanism allows an authenticator and a peer to be authenticated to establish a shared secret (K1) over an insecure channel. This shared secret is used to derive a response (C') to a challenge (C) sent by the authenticator, and also to derive a response (Cc') by the authenticator to the same challenge (C). This ensures that the shared secret (K1) or (Kc1) never gets communicated on the insecure channel. Rather only an encrypted response (C') is communicated via the insecure channel (e.g., the link 120 in FIGS. 2 and 3).

Message Exchanges

Exchange of messages that occurs in a typical SAC-based authentication technique is described below in the context of an EAP-SAC system. It should be understood, however, that embodiments of the SAC-based authentication technique are not limited to EAP and can be used as part of any other authentication protocol.

Figure 5:
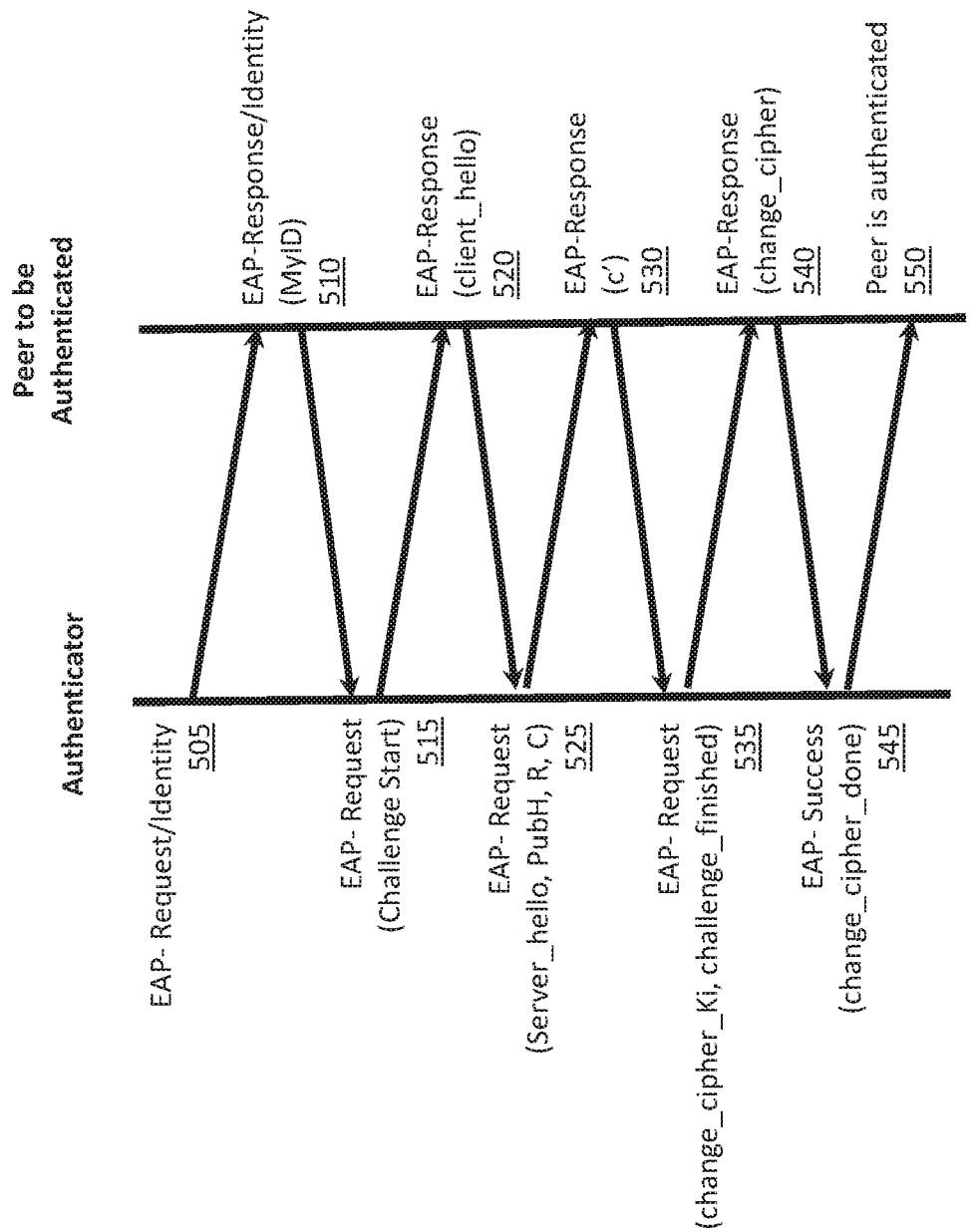
FIG. 5 illustrates a sequence of events and messages exchanged between an authenticator (also called a server) and a client (also called a peer to be authenticated), when the authentication succeeds, according to one embodiment.

With reference to FIG. 5, in an exemplary EAP-SAC authentication process according to one embodiment, a sequence of events that occur in a typical authentication process include:

Initiation and Identification—Steps 505 and 510

Method exchange—Steps 515 and 520

Challenge-Response—Steps 525 and 530

Challenge Accept or Failure—Steps 535 and 540

Change cipher confirmation—Steps 545 and 550

Initiation of EAP-SAC Conversation

An EAP authenticator sends an EAP-Request/Identity packet to the EAP peer (step 505) and the EAP peer responds with an EAP-Response/Identity packet to the EAP authenticator, communicating the identification information of the peer to be authenticated (step 510). Following the identity exchange an authenticator knows the unique identity of a peer to be authenticated.

EAP conversations occur between an EAP authenticator and the peer. The authenticator may choose, however, to be a pass-through device, where the authenticator encapsulates the EAP packets received from the peer and sends the encapsulated packet to a backend authentication server. As described here, an EAP server generally refers to either an authenticator or a combination of a pass-through identifier and a backend authentication server. The EAP-SAC conversation does not define any additional EAP packet nor does it add any new EAP message format.

Having received the peer's identity, the EAP server initiates a server_hello with EAP-Request/EAP-Type=EAP-SAC (step 515), notifying the peer of the start of an asymmetric challenge. The peer supporting EAP-SAC process responds with an acknowledgement of having received the asymmetric challenge start (step 520), indicating that it is expecting a challenge from the EAP server.

On confirming the identity of the peer to be authenticated and upon receiving notification that the peer can use EAP-SAC as an authentication mechanism the EAP server sends an EAP-SAC/Challenge packet containing (i) server hello indication (ii) authenticator's public key PubH (iii) random number R and (iv) a challenge C (step 525). The peer to be authenticated receives this EAP-SAC/Challenge packet and computes its symmetric session key K1 (=ECDH (PubH, PrivS, R)) and the corresponding response C' (=SYM_CIPHER (C, K1)) from the challenge C. The peer then sends the computed response to the EAP server using the EAP-SAC/Challenge-Response message (step 530).

The EAP server receives the EAP-SAC/Challenge-Response packet and computes a response locally using the EAP server's private key PrivH, the public key PubS of the peer to be authenticated (looked up in the public key database), and the same random number R that was sent to the peer to be authenticated. The session key computed by the EAP server is Kc1 (=ECDH (PubS, PrivH, R)), and using this session key the response is computed Cc'=SYM_CIPHER(C, Kc1) (step 535).

The EAP server locally compares C' and Cc'. If they match the authentication is successful and an authentication success message is sent from EAP server to the peer (step 535). The authentication success message is an EAP-Request/EAP-Type=EAP-SAC with change cipher and challenge finished message sent from the EAP server to the peer to be authenticated. The peer to be authenticated acknowledges the receipt of the change cipher message by responding with the EAP-Response/EAP-Type=EAP-SAC with a change cipher acknowledgement (step 540).

At this point neither the EAP server nor the peer has used symmetric keys for encrypting data. Upon receiving EAP-Response/EAP-Type=EAP-SAC with the change cipher done message, the EAP server completes the EAP handshake and sends out an EAP-Success message (step 545). Network access between the EAP server and the peer, which is now authenticated, is then enabled. The EAP server starts using Kc1 as its symmetric session key for encrypting communication. Upon receiving the EAP-Success message, the peer (now authenticated) changes its cipher suite to start using K1 as its symmetric session key for encrypting communication (step 550).

Authentication Failure

Figure 6:
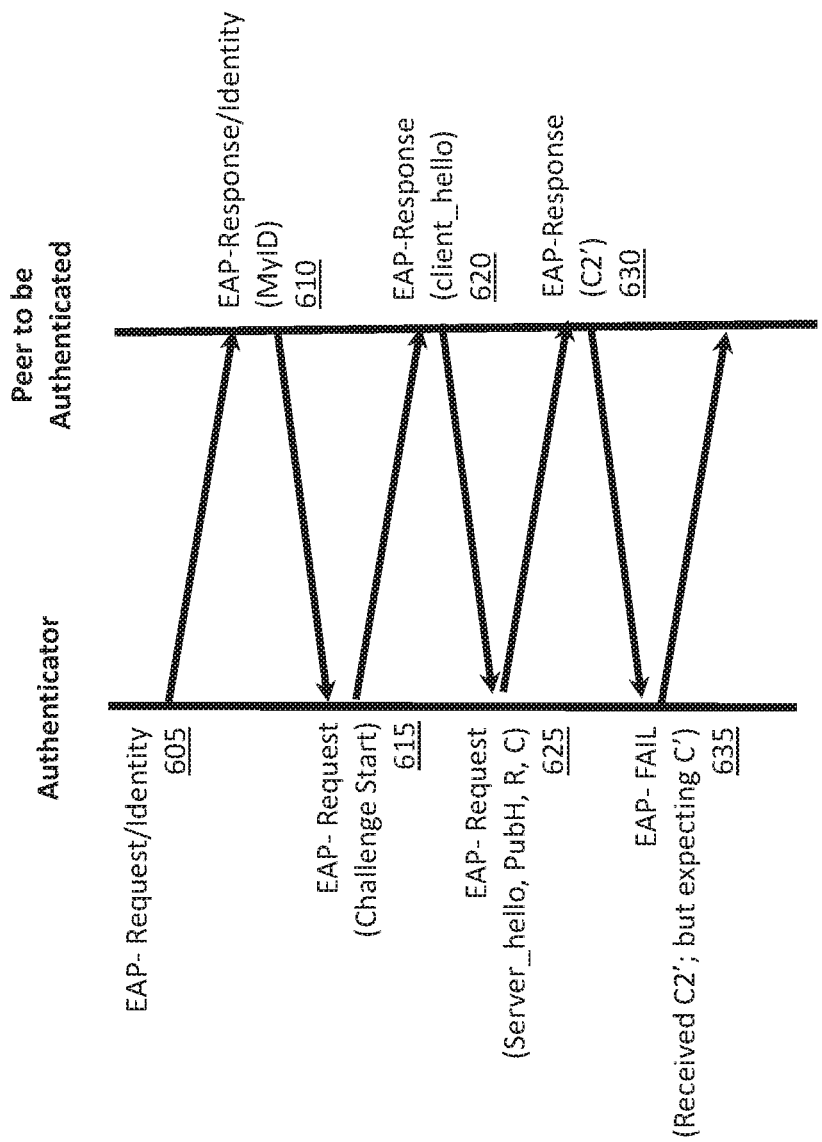
FIG. 6 illustrates a sequence of events and messages exchanged between an authenticator/server and a client/peer to be authenticated, when the authentication fails, according to one embodiment.

FIG. 6 illustrates an exemplary sequence of events when authentication fails, according to one embodiment, where steps 605-625 are similar, respectively, to steps 505-525 of FIG. 5.

During step 630 of the authentication process, however, the peer to be authenticated computes a response (C2') and not (C'). In step 635, the EAP server/authenticator receives the response (C2'), which does not match the cached or computed Challenge-Response Cc'. As such, the EAP server/authenticator determines that the peer's authentication is unsuccessful. The EAP server then sends an EAP-Request packet with EAP-Type=EAP-SAC/Failure message (step 635).

At this point the peer has an option to send an EAP-Response packet with EAP-Type=EAP-SAC (client_hello) packet with an option to restart the authentication process. At this point the server has an option to allow the peer to reauthenticate. According to one embodiment, a secure implementation limits the number of times a peer is allowed to attempt authentication during a certain window of time, e.g., a window of a few seconds, minutes, hours, etc., which can provide protection against a denial of service attack.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method, comprising:
   receiving an unencrypted message from an authenticator via an insecure channel, the unencrypted message comprising a public key of the authenticator, a random number, and a challenge message;
   accessing, from local storage at a peer, a private key of the peer;
   determining, by a state machine, a session key for the peer based on the random number, the public key of the authenticator, and the private key of the peer; and
   determining, by the state machine, a peer response to the challenge message using the session key for the peer and a symmetric cipher function.

2. The method of claim 1, wherein the peer comprises a sensor, a camera, or an Internet of Things (IoT) device, each of which lacks a processor capable of loading and executing software.

3. The method of claim 1, wherein the receiving is based on an extensible authentication protocol (EAP).

4. The method of claim 1, wherein computing the session key for the peer comprises executing an Elliptical Curve Diffie-Hellman (ECDH) function.

5. The method of claim 1, further comprising:
   receiving, from an external processor, an identifier for the peer and the private key of the peer; and
   storing the identifier and the private key of the peer in the local storage.

6. The method of claim 1, further comprising:
   transmitting an authentication initiation message to the authenticator;
   receiving, from the authenticator, a request for identification; and
   transmitting an identifier of the peer to the authenticator.

7. The method of claim 1, further comprising:
   receiving, from the authenticator, an authorization success message;
   encrypting an information packet using the session key of the peer; and
   transmitting, via the insecure channel, the encrypted packet to the authenticator.

8. The method of claim 1, further comprising:
   receiving, from the authenticator, an authorization failure message; and
   transmitting, in response to receiving the authorization failure message, an authentication initiation message to the authenticator.

9. A method, comprising:
   transmitting an unencrypted message comprising a public key of an authenticator, a random number, and a challenge message to a peer via an insecure channel;
   receiving, from the peer via the insecure channel, a peer response to the challenge message;
   determining a session key for the authenticator, based on the random number, a public key of the peer, and a private key of the authenticator;
   computing via a symmetric cipher function an authenticator response to the challenge message based on the session key for the authenticator; and authenticating the peer based on the authenticator response and the peer response.

10. The method of claim 9, wherein the steps of transmitting and receiving are based on an extensible authentication protocol (EAP).

11. The method of claim 9, wherein determining the session key for the authenticator comprises executing an Elliptical Curve Diffie-Hellman (ECDH) function.

12. The method of claim 9, further comprising:
receiving an authentication initiation message from the peer;
transmitting a request for identification to the peer; and
receiving, from the peer, an identifier of the peer.

13. The method of claim 12, further comprising:
locating the identifier of the peer in local storage and accessing therefrom the public key of the peer.

14. The method of claim 9, further comprising:
transmitting an authorization success message to the peer;
encrypting an information packet using the session key of the authenticator; and
transmitting via the insecure channel, the encrypted packet to the peer.

15. The method of claim 9, further comprising:
transmitting an authorization failure message to the peer;
receiving an authentication initiation message from the peer;
transmitting a request for identification to the peer; and
receiving, from the peer, an identifier of the peer.

16. The method of claim 9, further comprising:
transmitting an authorization failure message to the peer; and
suspending, for a specified time period, processing of subsequently received messages from the peer.

17. A system, comprising:
an authenticator configured to send via an insecure channel, an unencrypted message comprising a public key of the authenticator, a random number, and a challenge message;
a local storage at a peer configured to store a private key of the peer; and
a state machine is configured to:
determine a session key for the peer, based on the random number, the public key of the authenticator, and the private key of the peer; and
determine a peer response to the challenge message based on the session key for the peer and a symmetric cipher function.

18. The system of claim 17, wherein the peer comprises a sensor, a camera, or an Internet of Things (IoT) device, each of which lacks a processor capable of loading and executing software.

19. The system of claim 17, wherein the state machine is configured to execute an Elliptical Curve Diffie-Hellman (ECDH) function to determine the session key.

20. The system of claim 17, further comprising:
an external processor configured to generate an identifier for the peer and the private key of the peer, wherein the local storage is further configured to store the identifier and the private key of the peer.

21. The system of claim 17, wherein the state machine is further configured to:
transmit an authentication initiation message to the authenticator;
receive a request for identification from the authenticator; and
transmit an identifier of the peer to the authenticator.

22. The system of claim 17, wherein the state machine is further configured to:
receive an authorization success message from the authenticator;
encrypt, based on the session key, an information packet; and
transmit the encrypted information packet to the authenticator, via the insecure channel.

23. The system of claim 17, wherein the state machine is further configured to:
receive an authorization failure message from the authenticator; and
transmit an authentication initiation message to the authenticator.

24. A system, comprising:
a peer in communication with an authenticator via an insecure channel, the peer configured to:
receive, via the insecure channel, an unencrypted message comprising a public key of the authenticator, a random number, and a challenge message;
determine a session key for the peer based on the random number, the public key of the authenticator, and a private key of the peer;
determine a peer response to the challenge message using at least the session key for the peer; and
transmit the peer response via the insecure channel; and
the authenticator configured to:
receive the peer response via the insecure channel;
determine a session key for the authenticator based on the random number, a public key of the peer, and a private key of the authenticator;
determine an authenticator response to the challenge message based on the session key for the authenticator; and
authenticate the peer based on the authenticator response and the peer response.

25. The system of claim 24, wherein the session key for the authenticator is determined by executing an Elliptical Curve Diffie-Hellman (ECDH) function.

26. The system of claim 24, wherein the authenticator is further configured to:
receive an authentication initiation message from the peer;
transmit a request for identification to the peer; and
receive, from the peer, an identifier of the peer.

27. The system of claim 26,
wherein the identifier of the peer is stored in a local storage and the public key of the peer is retrieved from the local storage.

28. The system of claim 26,
wherein the public key of the peer is accessed from a network-connected database, and the identifier and the public key of the peer are stored in a local storage.

29. The system of claim 24, wherein the authenticator is further configured to:
transmit an authorization success message to the peer;
encrypt an information packet using the session key of the authenticator; and
transmit the encrypted packet to the peer via the insecure channel.

30. The system of claim 24, wherein the authenticator is further configured to:
transmit an authorization failure message to the peer;
receive an authentication initiation message from the peer;
transmit a request for identification transmitted to the peer; and
receive, from the peer, an identifier of the peer.

31. The system of claim 24, wherein the authenticator is further configured to:
  transmit an authorization failure message to the peer; and
  suspend processing of subsequently received messages from the peer for a specified time period.

* * * * *